April 24, 1934.     M. ALEX     1,955,723
BEVERAGE REFRIGERATING SYSTEM
Original Filed July 1, 1932
Fig. 1
Fig. 2
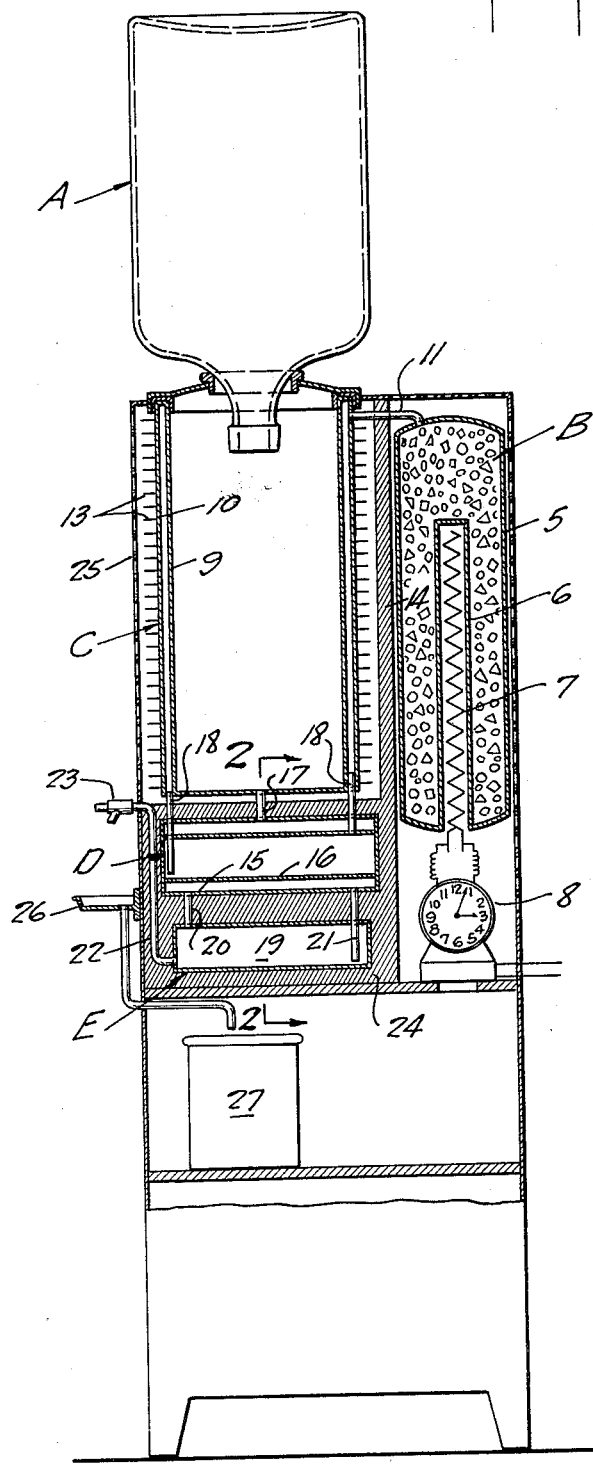
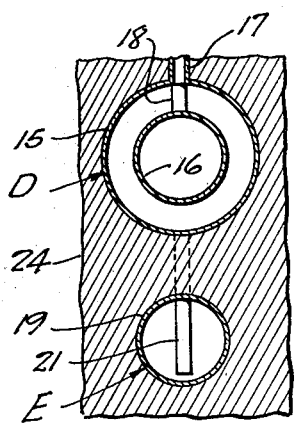
Inventor
Max Alex
By Ernest L. Nallace
Attorney Patented Apr. 24, 1934

1,955,723

UNITED STATES PATENT OFFICE 1,955,723

BEVERAGE REFRIGERATING SYSTEM

Max Alex, Alhambra, Calif.

Application July 1, 1932, Serial No. 620,357
Renewed October 30, 1933

11 Claims. (Cl. 62—141)

This invention relates to a refrigerating system for cooling fluids. The invention has a field of use in the cooling of beverages and is shown herein as embodied in a water cooler. The invention as embodied is an assembly of parts which will operate continuously and automatically requiring no attention by the user and no servicing of the refrigerating apparatus.

It is the primary object of this invention to provide a compact structure having no moving parts, noiseless and adaptable for maintaining a quantity of cool fluid available for withdrawal in limited amounts and to automatically replenish the cooled fluid withdrawn with fluid whose temperature has been lowered to that of the cool fluid. In the system, it is the intent to condense gaseous refrigerant and allow the liquid refrigerant to slowly evaporate over a period of time, employing the beverage itself as a heat withdrawal medium in the condenser and also controlling to an extent the evaporation of liquid refrigerant in proportion to withdrawal.

These objects together with other objects and corresponding accomplishments are obtained by means of the embodiment of my invention illustrated in the accompanying drawing, in which:—

Fig. 1 is a vertical sectional view through a water cooler; and Fig. 2 is a section as seen on the line 2—2 of Fig. 1.

Referring more particularly to the drawing, a cooler is shown having a base, a housing for the refrigerating apparatus and a demijohn A. Within the housing is a combined generator and absorber B which I will hereinafter refer to as a generator-absorber, a condenser C which constitutes conduit means for receiving a fluid refrigerant from the generator-absorber, an evaporator D which includes a condensate reservoir and a liquid cooling reservoir; and a storage chamber or cold liquid storage reservoir E.

The generator and absorber comprises a shell 5 having a central pocket 6 within which an electrical heater 7 is disposed. The heater is indicated as of coil form having leads whose circuit with a service line is made and broken by a clock operated control 8. These elements are well known and as shown are merely illustrative. The heater is operated to supply heat to the generator for a desired period of time and then to become inactive. As pertinent to the invention, it is a periodic heater and the control may be a time control or a thermostat. The heater is not confined to an electric heater as will be obvious. Within the shell 5 is a dry absorbent, such as calcium chloride.

The condenser comprises a tank 9 which constitutes a liquid receiving reservoir having a mouth at the top adapted to receive the neck of demijohn A for the supply of water. A shell 10 is spaced about tank 9 to provide an annular chamber or conduit connected by a pipe 11 to the generator and absorber shell 5. The annular chamber between tank 9 and shell 10 forms a refrigerant condensing jacket or conduit member having a wall exposed to the liquid in the tank 9 which acts as an economizing chamber. The outer wall of the condensing jacket has cooling fins 13. Between the generator and absorber and the condenser is a wall of insulating material 14.

Below the condenser is the evaporator D comprising a shell 15 which constitutes the liquid cooling reservoir within which is nested a tubular evaporating shell 16 which I may refer to as the condensate reservoir. The annular space between the shells 15 and 16 provides a cooling chamber for water connected to the economizing chamber by a passage 17. The chamber within shell 16 is a refrigerant evaporating chamber and is connected to the refrigerant condensing chamber by conduits 18. It will be seen that the pipe 11, the space between shells 9 and 10, and the connections 18, constitute "conduit means" which connect the generator-absorber and the condensate reservoir.

Below the evaporator is a cool water storage chamber or cold liquid storage reservoir 19 connected at its top by a conduit 20 to the bottom of the cooling chamber and connected by a riser conduit 21. A conduit 22 leads to a faucet 23 for withdrawal of water as desired. The evaporator and storage chamber 19 are encased in suitable insulation 24.

The housing for the refrigerating apparatus comprises a shell 25 which is preferably perforated to allow air access to the cooling jacket. A waste water trough for drippings from the faucet is marked 26 and a waste water reservoir 27.

The generator and absorber chamber, condensing chamber and refrigerant evaporating chamber may be charged with a fluid refrigerant such as ammonia. It will be noted that the system containing the refrigerant is sealed. The cooling and storage chambers are filled with water to be dispensed, a demijohn of water A being inserted in the mouth of the economizing chamber. A full demijohn may be substituted for empty demijohns as water is used. The clock control shown is intended to close the circuit and energize the heater for a selected interval of time and at predetermined times. Thus, the clock may be set to close the circuit at 1 o'clock and open it at 2 o'clock. On energizing the heater, the ammonia absorbed by the calcium chloride is driven off into the condensing chamber where heat is transferred to the water within the economizing chamber. A pressure is developed and ammonia is liquefied in the evaporating chamber. After the heater has become inactive, the heat absorbed by the water in the economizing chamber is transferred by way of the finned jacket to the atmosphere. The cooling calcium chloride then begins to absorb the ammonia gas and the liquid in the evaporating chamber is changed to gas as the latter is absorbed by the dry refrigerant. The latent heat required is transferred from the water in the cooling chamber and the temperature of the latter is lowered. The cold water then circulates to the storage chamber. The evaporation of refrigerant is dependent upon the amount of heat given up to the liquid refrigerant evaporating chamber and is thereby dependent upon the temperature of the water in the cooling chamber. Thus, the amount of water withdrawn is a factor controlling the rate of evaporation of the liquid refrigerant. The water in the economizing chamber is in the nature of a heat storage member which absorbs heat comparatively rapidly from the condensing chamber and then dissipates the heat slowly. The refrigerant apparatus produces liquid refrigerant in a short interval as compared with the time during which the liquid is evaporated and as in such a system the withdrawal of cold water is not rapid over a long period of time, the heat in the economizing chamber is transferred to the atmosphere and the temperature lowered to substantially that of the atmosphere before water enters the cooling chamber. Circulation between the cooling chamber and storage chamber is such that water withdrawn from the storage chamber is immediately replenished with cold water from the cooling chamber. Water from the economizing chamber then enters the cooling chamber and due to the increase of temperature, the evaporation of refrigerant in the evaporating chamber is speeded up until the water has been cooled. It will be noted that the storage chamber 19 is always filled with a supply of cold water and is not affected by the temperature of the water in the cooling and economizing chambers. Thus, heating of the generator and absorber does not affect the temperature of the supply of water in the storage chamber.

What I claim is:—

1. A refrigerating assembly comprising a combined generator and absorber chamber containing a dry absorbent carrying a fluid refrigerant; means for periodically heating said chamber; a condenser including a beverage supply and economizing chamber and a refrigerant condensing chamber having a heat transfer wall forming a wall for said economizing chamber; an evaporator below said condenser including a refrigerant evaporating chamber and a beverage cooling chamber with a heat transfer wall therebetween; a beverage storage chamber below said evaporator and means connected therewith for withdrawal of cold beverage; said generator and absorber, condensing and evaporating chambers being in communication in seriatim; and said economizing, cooling and storage chambers being in communication in seriatim, there being circulating passages for beverages between said cooling and storage chambers.

2. A refrigerating assembly comprising a combined generator and absorbing chamber containing a dry absorbent carrying a fluid refrigerant; means for periodically heating said chamber; a condenser including an upright beverage supply and economizing chamber, a refrigerant condensing chamber having a heat transfer wall forming a wall of said economizing chamber and a finned air cooling wall on said condenser chamber; an evaporator below said condenser including a refrigerant evaporating chamber and beverage cooling chamber with a heat transfer wall therebetween; a beverage storage chamber below said evaporator and means connected therewith for withdrawal of cold beverage; said generator and absorber, condensing and evaporating chambers being in communication in seriatim; and said economizing cooling and storage chambers being in communication in seriatim, there being circulating passages for beverage between said cooling and storage chambers.

3. A refrigerating assembly comprising a combined generator and absorber chamber containing a dry absorbent carrying a fluid refrigerant; means for periodically heating said chamber; a condenser including a beverage supply and economizing chamber and a refrigerant condensing chamber having a heat transfer wall forming a wall of said economizing chamber, means on said economizing chamber to receive and support a beverage supply container; an evaporator below said condenser including a refrigerant evaporating chamber and a beverage cooling chamber with a heat transfer wall therebetween; a beverage storage chamber below said evaporator and means connected therewith for withdrawal of cold beverage; said generator and absorber, condensing an evaporating chambers being in communication in seriatim; and said economizing, cooling and storage chambers being in communication in seriatim, there being circulating passages for beverage between said cooling and storage chambers.

4. A refrigerating assembly comprising a combined generator and absorber chamber containing a dry absorbent carrying a fluid refrigerant; means for periodically heating said chamber; a condenser including an upright beverage supply and economizing chamber, a refrigerant condensing chamber having a heat transfer wall forming a wall of said economizing chamber and a finned air cooling wall on said condenser chamber, and means on said economizing chamber to receive and support a beverage supply container; an evaporator below said condenser including a refrigerant evaporating chamber and a beverage cooling chamber with a heat transfer wall therebetween; a beverage storage chamber below said evaporator and means connected therewith for withdrawal of cold beverage; said generator and absorber, condensing and evaporating chambers being in communication in seriatim; and said economizing, cooling and storage chambers being in communication in seriatim, there being circulating passages for beverages between said cooling and storage chambers.

5. A refrigerating assembly comprising a combined generator and absorbing chamber containing a dry absorbent carrying a fluid refrigerant; means for periodically heating said chamber; a condenser including an upright beverage supply and economizing chamber and a refrigerant condensing jacket about said economizing chamber; an evaporator below said condenser including a refrigerant evaporating chamber and a beverage cooling chamber nested therein; a beverage storage chamber below said evaporator and means connected therewith for withdrawal of cold beverage; said generator and absorbing chamber, said condensing jacket and said evaporating chamber being in communication in seriatim; and said economizing, cooling and storage chambers being in communication in seriatim, there being circulating passages for beverages between said cooling and storage chambers.

6. A refrigerating assembly comprising a combined generator and absorber chamber containing a dry absorbent carrying a fluid refrigerant; means for periodically heating said chamber; a condenser including an upright beverage supply and economizing chamber, a refrigerant condensing jacket about said economizing chamber and a finned air cooling jacket about said condenser jacket; an evaporator below said condenser including a refrigerant evaporating chamber and a beverage cooling chamber in nested relation; a beverage storage chamber below said evaporator and means connected therewith for withdrawal of cold beverage; said generator and absorber chamber, said condensing jacket and said evaporating chamber being in communication in seriatim; and said economizing, cooling and storage chambers being in communication in seriatim, there being circulating passages for beverage between said cooling and storage chambers.

7. A refrigerating assembly comprising a combined generator and absorber chamber containing a dry absorbent carrying a fluid refrigerant; means for periodically heating said chamber; a condenser including a beverage supply and economizing chamber and a refrigerant condensing jacket about said economizing chamber, and means on said economizing chamber to receive and support a beverage supply container; an evaporator below said condenser including a refrigerant evaporating chamber and a beverage cooling chamber in nested relation; a beverage storage chamber below said evaporator and means connected therewith for withdrawal of cold beverage; said generator and absorber chamber, said condensing jacket and said evaporating chamber being in communication in seriatim; and said economizing, cooling and storage chambers being in communication in seriatim, there being circulating passages for beverage between said cooling and storage chambers.

8. A refrigerating assembly comprising a combined generator and absorber chamber containing a dry absorbent carrying a fluid refrigerant; means for periodically heating said chamber; a condenser including an upright beverage supply and economizing chamber, a refrigerant condensing jacket about said economizing chamber and a finned air cooling jacket about said condenser jacket, and means on said economizing chamber to receive and support a beverage supply container; an evaporator below said condenser including a refrigerant evaporating chamber and a beverage cooling chamber nested therein; a beverage storage chamber below said evaporator and means connected therewith for withdrawal of cold beverage; said generator and absorber chamber, said condensing jacket and said evaporating chamber being in communication in seriatim; and said economizing, cooling and storage chambers being in communication in seriatim, there being circulating passages for beverage between said cooling and storage chambers.

9. A liquid cooler of the class described embodying: a liquid receiving reservoir; a liquid cooling reservoir; a conduit connecting said reservoirs; a generator absorber containing an absorbent and a fluid refrigerant; means for periodically heating said absorbent to expel said fluid refrigerant; conduit means for receiving the fluid refrigerant from said absorber generator, said conduit means having a wall exposed to liquid in said liquid receiving reservoir; and a condensate reservoir having a wall exposed to liquid in said liquid cooling reservoir and connected with said last mentioned conduit means.

10. A liquid cooler of the class described embodying: a liquid receiving reservoir; a liquid cooling reservoir and a cold liquid storage reservoir; means connecting said reservoirs in series; a generator absorber containing an absorbent and a fluid refrigerant; means for periodically heating said absorbent to expel said fluid refrigerant; conduit means for receiving the fluid refrigerant from said absorber generator, said conduit means having a wall exposed to liquid in said liquid reservoir; and a condensate reservoir having a wall exposed to liquid in said liquid cooling reservoir and connected with said last mentioned conduit means.

11. The method of cooling a liquid which comprises: first, heating for a limited time a dry absorbent containing a fluid refrigerant to expel said refrigerant, absorbing the heat from said expelled refrigerant and condensing same by passing said refrigerant through a passage in heat absorbing relation with a body of liquid to be cooled, collecting the condensed refrigerant in a container in heat absorbing relation with a second body of said liquid and dissipating the heat absorbed by said first body of liquid to the atmosphere; and, second, cooling said absorbent, thereby permitting the reabsorption of gaseous refrigerant and consequent vaporization of condensed refrigerant, and returning the condensed refrigerant thus vaporized to said absorbent through a passage in heat absorbing relation with said first body of liquid thereby absorbing heat from said second and first bodies of liquid respectively.

MAX ALEX.